US011891754B2

(12) United States Patent
Mathur et al.

(10) Patent No.: US 11,891,754 B2
(45) Date of Patent: Feb. 6, 2024

(54) FLAME RETARDANTS FOR TEXTILE APPLICATIONS

(71) Applicant: Albemarle Corporation, Charlotte, NC (US)

(72) Inventors: Rajeev S. Mathur, Baton Rouge, LA (US); Jon Shannon Reed, Hazlehurst, MS (US); Daniel A. De Schryver, Bonheiden (BE); John Randall Chaya, Baton Rouge, LA (US)

(73) Assignee: Albemarle Corporation, Charlotte, NC (US)

( * ) Notice: Subject to any disclaimer, the term of this patent is extended or adjusted under 35 U.S.C. 154(b) by 680 days.

(21) Appl. No.: 17/041,950

(22) PCT Filed: Mar. 12, 2019

(86) PCT No.: PCT/US2019/021807
§ 371 (c)(1),
(2) Date: Sep. 25, 2020

(87) PCT Pub. No.: WO2019/199403
PCT Pub. Date: Oct. 17, 2019

(65) Prior Publication Data
US 2021/0131027 A1  May 6, 2021

Related U.S. Application Data

(60) Provisional application No. 62/654,777, filed on Apr. 9, 2018.

(51) Int. Cl.
| | |
|---|---|
| *D06M 15/233* | (2006.01) |
| *C08L 25/06* | (2006.01) |
| *C09D 125/06* | (2006.01) |
| *D06M 15/252* | (2006.01) |

(52) U.S. Cl.
CPC ......... *D06M 15/233* (2013.01); *C08L 25/06* (2013.01); *C09D 125/06* (2013.01); *D06M 15/252* (2013.01); *D06M 2200/30* (2013.01)

(58) Field of Classification Search
CPC ............ D06M 15/233; D06M 15/252; D06M 2200/30; C08L 25/06; C09D 125/06
USPC ....................................................... 524/501
See application file for complete search history.

(56) References Cited

U.S. PATENT DOCUMENTS

| | | | |
|---|---|---|---|
| 3,974,310 A | 8/1976 | Mischutin | |
| 4,304,812 A | 12/1981 | Perkins | |
| 4,446,202 A | 5/1984 | Mischutin | |
| 4,737,386 A | 4/1988 | Wotier et al. | |
| 4,755,573 A | 7/1988 | Aycock | |
| 5,457,248 A | 10/1995 | Mack et al. | |
| 6,235,831 B1 | 5/2001 | Reed et al. | |
| 6,521,714 B2 | 2/2003 | Kolich et al. | |
| 7,632,893 B2 | 12/2009 | Kolich et al. | |
| 7,638,583 B2 | 12/2009 | Kolich et al. | |
| 7,666,944 B2 | 2/2010 | De Schryver et al. | |
| 8,420,876 B2 | 4/2013 | Layman, Jr. et al. | |
| 8,796,388 B2 | 8/2014 | Layman, Jr. et al. | |
| 8,993,684 B2 | 3/2015 | Layman, Jr. et al. | |
| 2001/0044488 A1 | 11/2001 | Yasuda et al. | |
| 2004/0121114 A1 | 6/2004 | Piana et al. | |
| 2009/0325441 A1 | 12/2009 | Loos et al. | |
| 2011/0130520 A1 | 6/2011 | Layman, Jr. et al. | |

FOREIGN PATENT DOCUMENTS

| | | | |
|---|---|---|---|
| CN | 108102053 A | 6/2018 | |
| WO | 2008/154453 A1 | 12/2008 | |
| WO | 2009/148464 A1 | 12/2009 | |
| WO | 2014/014648 A2 | 1/2014 | |
| WO | WO-2014014648 A2 * | 1/2014 | .......... D06M 15/227 |
| WO | 2017/176740 A1 | 10/2017 | |

OTHER PUBLICATIONS

Saytex BT-93W Flame Retardant Data Sheet, Albemarle Corporation, 2016, 2 pages.
Saytex HP-3010 Flame Retardant data sheet, Albemarle Corporation, 2014, 2 pages.
Saytex HP-7010 Flame Retardant data sheet, Albemarle Corporation, 2014, 2 pages.
Saytex 8010 Flame Retardant data sheet, Albemarle Corporation, 2016, 3 pages.

* cited by examiner

*Primary Examiner* — Ling Siu Choi
*Assistant Examiner* — Ronald Grinsted
(74) *Attorney, Agent, or Firm* — Mary H. Drabnis; R. Andrew Patty, II; Phelps Dunbar LLP

(57) ABSTRACT

This invention provides aqueous flame retardant dispersions comprising water, a brominated flame retardant containing aromatically-bound bromine, at least one dispersant, at least one wetting agent, and at least one thickener. The brominated flame retardant has an average particle size of about 20 μm or less. The flame retardant dispersion contains about 50 wt % or more of brominated polymeric flame retardant, based on the total weight of the dispersion. Also provided are coating compositions, processes for forming flame retardant dispersions, processes for forming coating compositions, and processes for applying the coating compositions to textile substrates.

20 Claims, No Drawings

US 11,891,754 B2

FLAME RETARDANTS FOR TEXTILE APPLICATIONS

REFERENCE TO RELATED APPLICATIONS

This application is the National Stage of International Patent Appl. No. PCT/US2019/021807 filed on Mar. 12, 2019, which in turn claims the benefit of U.S. Provisional Patent Appln. No. 62/654,777, filed on Apr. 9, 2018, the disclosures of which are incorporated herein by reference.

TECHNICAL FIELD

This invention relates to aqueous flame retardant dispersions, aqueous coating compositions for flame retarding textiles, and to textiles flame retarded with the aqueous coating compositions.

BACKGROUND

Many textiles are flame-retarded to minimize the spread of fire. Flame-retarding the fibers that form textiles is known in the art. Coating and backcoating of textile substrates is known in the art. However, the art continually looks for improved flame retardancy for textiles.

SUMMARY OF THE INVENTION

This invention provides coating compositions that contain flame retardants and processes for applying the coating compositions to textile substrates. The flame retardants are brominated aromatic polymeric flame retardants. Textile substrates that are flame retarded with these brominated aromatic polymeric flame retardants have very good flame retardant performance in both the NFPA-701 test and in the FMVSS-302 test.

An embodiment of this invention is an aqueous flame retardant dispersion comprising water, a brominated flame retardant, at least one dispersant, at least one wetting agent, and at least one thickener. The brominated flame retardant contains aromatically-bound bromine, and has an average particle size of about 20 μm or less. The flame retardant dispersion contains about 50 wt % or more of the brominated flame retardant, based on the total weight of the dispersion.

These and other embodiments and features of this invention will be still further apparent from the ensuing description and appended claims.

FURTHER DETAILED DESCRIPTION OF THE INVENTION

As used throughout this document, the phrase "textile substrate" refers to synthetic and natural fibers, fabric, yarn, thread, and cloth (woven and non-woven). Textile substrates to which a coating composition can be applied in the practice of this invention include, but are not limited to, wool, silk, cotton, linen, flax, jute, rayon, polyolefins (e.g., polypropylene), nylons, polyamides, polyesters, acrylics, and blends thereof, including e.g., cotton/polyester blends.

Textile substrates to which the coating composition can be applied are used in furniture, upholstery, draperies and wall coverings, transportation (e.g., automotive, railway, aircraft, marine), construction, signage and banners, and apparel, especially personal protective equipment.

The aqueous flame retardant dispersion is often referred to as a "flame retardant dispersion" throughout this document. The unmodified term "dispersion" as used throughout this document also refers to aqueous flame retardant dispersions.

The flame retardant dispersions of this invention are aqueous dispersions which comprise water, a brominated flame retardant, at least one dispersant, at least one wetting agent, and at least one thickener. The wetting agent is understood to make the brominated flame retardants, which are water-insoluble, compatible with water, and the thickener stabilizes the dispersion against separation.

The brominated flame retardants in the practice of this invention contain aromatically-bound bromine, and in several embodiments are considered to be brominated styrenic polymers. The brominated flame retardants have weight average molecular weights ($M_w$) of about 650 to about 950,000 and a bromine content of about 60 wt % or more. Preferably, the styrenic polymers are polystyrenes. Mixtures of two or more brominated flame retardants can be used in the practice of this invention.

In some embodiments, the brominated flame retardant is a brominated styrenic polymer in which the styrenic polymer was formed by free-radical polymerization; these brominated flame retardants typically have a weight average molecular weight ($M_w$) of about 100,000 or more, preferably about 300,000 or more, more preferably about 500,000 or more. In some embodiments, the brominated styrenic polymers formed by free-radical polymerization have $M_w$ in the range of about 100,000 to about 950,000, preferably about 300,000 to about 800,000, more preferably about 500,000 to about 700,000.

In the brominated polystyrene formed by free radical polymerization, the bromine content is generally about 60 wt % or more, preferably about 67 wt % or more, more preferably about 68 wt % or more. Ranges for the bromine content for the free radical polymerization brominated styrenic polymers are preferably about 60 wt % to about 71 wt %, more preferably about 67 wt % to about 71 wt % bromine, even more preferably about 68 wt % to about 71 wt % bromine. Preferably, the styrenic polymer is polystyrene. In a preferred embodiment, the free-radical-polymerized brominated anionic styrenic polymers has a $M_w$ of about 600,000 to about 650,000, and a bromine content of about 67 wt % to about 69 wt %. Information on the preparation of brominated styrenic polymers when the styrenic polymers were formed by a free radical method is found for example in U.S. Pat. Nos. 6,235,831 and 6,521,714.

In other embodiments, the brominated flame retardants are brominated anionic styrenic polymers, in which the styrenic polymers were formed via anionic polymerization, typically with an alkyl lithium initiator; these brominated flame retardants generally have a weight average molecular weight ($M_w$) of about 8000 or more, preferably about 10,000 or more. In some embodiments, the brominated anionic styrenic polymers have a $M_w$ of about 8000 to about 50,000, preferably about 10,000 to about 30,000, and more preferably about 10,000 to about 20,000.

Typically, the brominated anionic styrenic polymers contain about 60 wt % or more bromine, preferably about 66 wt % or more bromine, more preferably about 67 wt % or more bromine. In some embodiments, the brominated anionic styrenic polymers contain about 60 wt % to about 72 wt % bromine, more preferably about 66 wt % to about 71 wt % bromine, even more preferably about 67 wt % to about 71 wt % bromine. Preferably, the brominated anionic styrenic polymer is a brominated anionic polystyrene. In some embodiments, the brominated anionic styrenic polymers are brominated anionic polystyrene having a weight average molecular weight of about 10,000 to about 20,000, and about 67 wt % to about 69 wt % bromine. Information on the preparation of brominated anionic styrenic polymers is found for example in U.S. Pat. Nos. 7,632,893 and 7,638,583.

In another embodiment, the brominated flame retardant is a low molecular weight brominated anionic styrenic polymer having a weight average molecular weight ($M_w$) of about 650 or more, preferably about 950 or more, more preferably about 1000 or more. In some embodiments, these brominated anionic styrenic polymers have an $M_w$ in the range of about 650 to about 4000, preferably about 950 to about 3500, and more preferably about 1000 to about 3500.

Typically, the low molecular weight brominated anionic styrenic polymers contain about 60 wt % or more bromine, preferably about 66 wt % or more bromine, more preferably about 73 wt % or more bromine. In some embodiments, these brominated anionic styrenic polymers contain about 60 wt % to about 77 wt % bromine, preferably about 66 wt % to about 77 wt %, more preferably about 73 wt % to about 77 wt % bromine.

Preferably, the low molecular weight brominated anionic styrenic polymers are brominated anionic polystyrenes. In some embodiments, the low molecular weight brominated anionic styrenic polymers are brominated anionic polystyrenes having a weight average molecular weight of about 1000 to about 3000, and about 73 wt % to about 77 wt % bromine.

The low molecular weight brominated anionic styrenic polymers can be formed by bromination in an organic solvent or in a sea of bromine (in which bromine is both the brominating agent and the solvent). Information on the preparation of low molecular weight brominated anionic styrenic polymers is found for example in International Patent Publication No. WO 2017/176740; these polymers can also be made as described U.S. Pat. Nos. 7,632,893 and 7,638,583.

Another brominated flame retardant that can be used in the practice of this invention is sometimes not categorized as a styrenic polymer due to the relatively small number of repeating units in these molecules. Similar to the brominated styrenic polymers, these molecules also contain aromatically-bound bromine, and styrenic repeating units. This brominated flame retardant is a brominated anionic chain transfer vinyl aromatic polymer which contains about 70 wt % or more bromine, preferably about 72 wt % or more bromine, and a weight average molecular weight of about 1000 or more, preferably about 1250 or more. In some embodiments, the bromine content is in the range of about 70 wt % to about 79 wt %, preferably about 72 wt % to about 78 wt %, and the Mw is in the range of about 1000 to about 21,000, preferably about 1250 to about 14,000, more preferably about 2000 to about 10,000.

Preferably, the brominated anionic chain transfer vinyl aromatic polymers are brominated anionic chain transfer polystyrenes. In some embodiments, the brominated anionic chain transfer vinyl aromatic polymers are brominated anionic chain transfer polystyrenes having a weight average molecular weight of about 2000 to about 10,000, and about 72 wt % to about 78 wt % bromine.

The brominated anionic chain transfer vinyl aromatic polymers can be formed by bromination in an organic solvent or in a sea of bromine (in which bromine is both the brominating agent and the solvent). Information on the preparation of brominated anionic chain transfer vinyl aromatic polymers is found for example in U.S. Pat. Nos. 8,420,876, 8,796,388, and 8,993,684.

In the practice of this invention, the brominated flame retardant has an average particle size of about 20 µm or less, preferably about 15 µm or less, and more preferably about 10 µm or less. In some embodiments, the brominated flame retardant has an average particle size in the range of about 0.1 µm to about 20 µm, preferably about 0.5 µm to about 15 µm; more preferably, the average particle size is about 1 µm to about 10 µm.

The brominated flame retardants generally need to be subjected to one or more size reduction methods to obtain the desired average particle size. Such methods typically include grinding or pulverizing the brominated flame retardant particles. Milling is a preferred method for reducing the particle size of the brominated flame retardant particles. Ball mills, hammer mills, and jet mills, or combinations of two or more of these, can be used; preferably, the particle size reduction is achieved with a jet mill.

The flame retardant dispersion contains brominated flame retardant in an amount of about 25 wt % or more, preferably about 50 wt % or more, more preferably about 60 wt % or more, based on the total weight of the dispersion. In some embodiments, the brominated flame retardant is about 25 wt % to about 80 wt %, preferably 50 wt % to about 80 wt %, more preferably about 60 wt % to about 75 wt %, even more preferably about 65 wt % to about 75 wt %, based on the total weight of the dispersion.

In the practice of this invention, the dispersants are polymeric surfactants, preferably polymeric anionic surfactants. Suitable dispersants include sodium polynaphthalene sulfonate.

The dispersant is about 0.1 wt % or more, preferably about 0.2 wt % or more, more preferably about 0.3 wt % or more, based on the total weight of the dispersion. In some embodiments, the dispersant is about 0.1 wt % to about 3 wt %, preferably about 0.2 wt % to about 1 wt %, more preferably about 0.3 wt % to about 0.7 wt %, based on the total weight of the dispersion.

Wetting agents are surfactants, particularly nonpolymeric surfactants, preferably nonpolymeric anionic surfactants. Examples of suitable surfactants that can be used as wetting agents in the practice of this invention include sodium ammonium dodecyl sulfate, sodium dioctyl sulfosuccinate, sodium dodecyl sulfate, sodium lauryl ether sulfate, sodium dodecyl benzene sulfonate. Preferred wetting agents include sodium dioctyl sulfosuccinate.

The wetting agent is about 0.1 wt % or more, preferably about 0.3 wt % or more, more preferably about 0.4 wt % or more, based on the total weight of the dispersion. In some embodiments, the wetting agent is about 0.1 wt % to about 3 wt %, preferably about 0.3 wt % to about 1.5 wt %, more preferably about 0.4 wt % to about 1 wt %, based on the total weight of the dispersion.

Suitable thickeners that can be used in the practice of this invention include sodium polyacrylate, carboxymethylcellulose, ethoxycellulose, and methoxycellulose. Preferred thickeners include sodium polyacrylate. Thickeners are typically provided in solution, often aqueous solution.

The thickener is about 0.05 wt % or more, preferably about 0.1 wt % or more, based on the total weight of the dispersion. In some embodiments, the thickener is about 0.05 wt % to about 1.0 wt %, preferably about 0.1 wt % to about 0.5 wt %, more preferably about 0.15 wt % to about 0.4 wt %, based on the total weight of the dispersion.

Optional ingredients that can be present in the flame retardant dispersion include. but are not limited to, dyes, wrinkle resist agents, antifoaming agents, biocidal agents, buffers, pH stabilizers, fixing agents, stain repellants such as fluorocarbons, stain blocking agents, soil repellants, wetting agents, softeners, water repellants, stain release agents, optical brighteners, plasticizers, and emulsifiers.

The flame retardant dispersions preferably have a viscosity in the range of about 2000 cP to about 6000 cP, preferably about 3500 cP to about 4500 cP.

The pH of the flame retardant dispersions is preferably about 7 to about 10, more preferably about 7.5 to about 9.5.

The processes for forming aqueous flame retardant dispersions of the invention comprise combining water, a brominated flame retardant, at least one dispersant, at least one wetting agent, and at least one thickener. The brominated flame retardant has an average particle size of about 20 µm or less. The brominated flame retardant is about 50 wt % or more of the dispersion, based on the total weight of the dispersion.

The components of the flame retardant dispersion can be combined with water in any order. For example, water, the dispersant, and the wetting agent can be combined, followed by the brominated flame retardant, and then the thickener is introduced. Preferably, at least some the components of the flame retardant dispersion are brought together with strong agitation, usually provided by a high speed, high shear mixer.

If the viscosity of the flame retardant dispersion is below the desired value, additional thickener is usually added; if the viscosity of the flame retardant dispersion is above the desired value, additional water is usually added.

The brominated flame retardants and preferences therefor, as well as amounts and preferred amounts thereof, are as described above for the aqueous flame retardant dispersions.

The dispersants, wetting agents, and thickeners, and preferences therefor, as well as amounts and preferred amounts, are as described above for the aqueous flame retardant dispersions.

Optional ingredients that can be introduced during preparation of the flame retardant dispersion are as described above for the aqueous flame retardant dispersions.

The flame retardant dispersions prepared by these processes preferably have viscosities and pH values as described above. The coating compositions of this invention are aqueous compositions, and comprise water, a brominated flame retardant, at least one dispersant, at least one wetting agent, at least one thickener, at least one flame retardant synergist, and at least one coating resin. The brominated flame retardant contains aromatically-bound bromine; the brominated flame retardant has an average particle size of about 20 µm or less. The brominated flame retardant is about 2 wt % or more of the coating composition, based on the total weight of the coating composition.

Throughout this document, the term "coating" is used collectively to refer to a coating on the front side of a textile substrate, a backcoating, or both, unless otherwise specified.

One or more flame retardant synergists are included in the coating composition. Examples of flame retardant synergists include, but are not limited to, antimony trioxide, antimony pentoxide, sodium antimonate, potassium antimonate, iron oxide, zinc borate, zinc oxide, and zinc stannate. Antimony-containing synergists are preferred; antimony trioxide and antimony pentoxide are preferred antimony-containing synergists, especially antimony trioxide.

The flame retardant synergist is about 3 wt % or more, preferably about 5 wt % or more, more preferably about 10 wt % or more, based on the total weight of the coating composition. In some embodiments, the flame retardant synergist is about 3 wt % to about 30 wt %, preferably about 5 wt % to about 25 wt %, more preferably about 10 wt % to about 20 wt %, based on the total weight of the coating composition.

The coating resin is one or more polymers that form films at ambient temperature or at elevated temperatures, and can be selected from stable polymeric dispersions known and used for binding, coating, impregnating or related uses, and may be self-crosslinking or externally crosslinked. The polymeric constituent can be an addition polymer, a condensation polymer. or a cellulose derivative. Non-limiting examples of suitable polymers include foamed or unfoamed organosols, plastisols, latexes, and the like, which contain one or more polymeric constituents which include vinyl halides such as polyvinyl chloride, polyvinyl chloride-polyvinyl acetate, polyethlyene-polyvinyl acetate, and polyethylene-polyvinyl chloride; polymers and copolymers of vinyl esters such as polyvinyl acetate, polyethylene-polyvinyl and polyacrylic-polyvinyl acetate; polymers and copolymers of acrylate monomers such as ethyl acrylate, methyl acrylate, butyl acrylate, ethylbutyl acrylate, ethylhexyl acrylate, hydroxyethyl acrylate and dimethylaminoethyl acrylate; polymers and copolymers of methacrylate monomers such as methyl methacrylate, ethyl methacrylate, isopropyl methacrylate and butyl methacrylate; polymers and copolymers of acrylonitrile, methacrylonitrile, acrylamide, N-isopropylacrylamide, N-methylolacrylamide and methacrylamide; vinylidene polymers and copolymers such as polyvinylidene chloride, polyvinylidene chloride-polyvinyl chloride, polyvinylidene chloride-polyethyl acrylate and polyvinylidene chloride-polyvinyl chloride-polyacrylonitrile; polymers and copolymers of olefin monomers including ethylene and propylene as well as polymers and copolymers of 1,2-butadiene, 1,3-butadiene, 2-ethyl-1,3-butadiene, and the like; natural latex; polyurethanes, polyamides; polyesters; polymers and copolymers of styrene including styrene, 2-methylstyrene, 3-methylstyrene, 4-methylstyrene, 4-ethylstyrene, and 4-butylstyrene; phenolic emulsions; aminoplast resins, polyurethanes, and the like. The use of such polymers in the coating of textile substrates is well-known in the art; see for example U.S. Pat. Nos. 4,737,386 and 4,304,812.

Preferred coating resins include polyvinyl chloride and copolymers thereof, especially polyvinyl chloride acrylate copolymers, acrylic copolymers, and EVA (a copolymer of ethylene and vinyl acetate). The polymers that are the coating resin are preferably used as emulsions (e.g., latexes) in water.

The coating composition contains coating resin as a latex in an amount of about 15 wt % or more, preferably about 20 wt % or more, based on the total weight of the coating composition. In some embodiments, the coating resin is about 15 wt % to about 40 wt %, preferably about 20 wt % to about 30 wt %, more preferably about 22 wt % to about 27 wt %, based on the total weight of the coating composition.

The coating compositions generally have a viscosity in the range of about 7000 cP to about 15,000 cP, preferably about 7500 cP to about 12,000 cP, more preferably about 8000 cP to about 10,000 cP.

The pH of the coating compositions is preferably about 7 to about 10.5, more preferably about 9 to about 10.

In the coating compositions, the brominated flame retardants and preferences therefor, are as described above for the aqueous flame retardant dispersions. The dispersants, wetting agents, and thickeners, and preferences therefor, are as described above for the aqueous flame retardant dispersions.

The coating composition contains brominated flame retardant in an amount of about 4 wt % or more, preferably about 10 wt % or more, more preferably about 15 wt % or more, based on the total weight of the coating composition. In some embodiments, the brominated flame retardant is about 4 wt % to about 50 wt %, preferably about 10 wt % to about 35 wt %, more preferably about 15 wt % to about 25 wt %, based on the total weight of the coating composition.

Optional ingredients that can be present in the coating composition are as described above for the aqueous flame retardant dispersions.

The processes for forming coating compositions of the invention comprise combining water, a brominated flame retardant, at least one flame retardant synergist, at least one dispersant, at least one wetting agent, at least one thickener, and at least one resin. The brominated flame retardant has an average particle size of about 20 μm or less. The brominated flame retardant is about 4 wt % or more, based on the total weight of the coating composition.

Typically, the coating resin is suspended in water to form a latex prior to combination with the other components of the coating composition. This latex can be combined with the other components in any order. For example, water and any desired optional components can be combined with the coating resin latex, and then the brominated flame retardant, wetting agent, dispersant, and thickener can be added, followed by the flame retardant synergist. The components of the coating composition are brought together with strong agitation, usually provided by a high speed, high shear mixer.

When the coating composition is formed from a flame retardant dispersion, the flame retardant dispersion is about 15 wt % or more of the coating composition, preferably about 20 wt % or more, more preferably about 25 wt % or more, based on the total weight of the coating composition. In some embodiments, the flame retardant dispersion is about 15 wt % to about 50 wt %, preferably about 20 wt % to about 45 wt %, more preferably about 25 wt % to about 40 wt %, based on the total weight of the coating composition.

If the viscosity of the coating composition is below the desired value, additional thickener is usually added; if the viscosity of the coating composition is above the desired value, additional water is usually added.

The brominated flame retardants and preferences therefor, as well as amounts and preferred amounts thereof, are as described above for the aqueous flame retardant dispersions. Amounts and preferred amounts for the brominated flame retardants are as described above for the coating compositions.

The dispersants, wetting agents, and thickeners, and preferences therefor, are as described above for the aqueous flame retardant dispersions. Amounts and preferred amounts for these components are as described above for the coating compositions.

Flame retardant synergists and preferences therefor, as well as the amounts and preferred amounts, are as described above for the coating compositions. The flame retardant synergist can be included at any point during the preparation of the coating composition.

Coating resins and preferences therefor, as well as the amounts and preferred amounts, are as described above for the coating compositions.

Optional ingredients that can be introduced during preparation of the coating composition are as described above for the aqueous flame retardant dispersions. An optional ingredient not present in a flame retardant dispersion may be present in the coating composition.

The coating compositions prepared by these processes preferably have viscosities and pH values as described above.

The processes for coating textile substrates comprise contacting a textile substrate and a coating composition to form a coated textile substrate, where the coating composition is as described above.

The coating composition is applied to the textile substrate with any convenient method, for example by knife coating, dip-coating, padding, or foam formation. As part of these methods, excess coating composition is removed. After removal of any excess coating composition, the coating formed on the textile substrate is dried to remove water and any volatiles, e.g., by heating or by blowing at ambient or elevated temperature. Heating is typically employed at one or more temperatures in the range of about 70° C. to about 175° C., preferably about 90° C. to about 150° C.

The loading of the coating composition after driving off water and other volatiles on the coated textile substrate is about 5 wt % or more, preferably about 15 wt % or more, based on the total weight of the coated textile substrate. In some embodiments, the coating composition is about 5 wt % to about 80 wt %, preferably about 15 wt % to about 50 wt %, more preferably about 15 wt % to about 30 wt %, based on the total weight of the coated textile substrate.

These loadings of the coating composition on the coated textile substrate result in amounts of brominated flame retardant on the coated textile substrate of about 2 wt % or more, preferably about 4 wt % or more, more preferably about 6 wt % or more, based on the total weight of the coated textile substrate. In some embodiments, the brominated flame retardant is about 2 wt % to about 60 wt %, preferably about 4 wt % to about 40 wt %, more preferably about 10 wt % to about 30 wt %, based on the total weight of the coated textile substrate. For some fabrics, higher amounts of the brominated flame retardants may be needed; the composition of the coating mixture also has an effect on the amount of brominated flame retardant needed to provide effective flame retardancy to the textile substrate.

The brominated flame retardant remains in the textile substrate as part of the coating; the brominated flame retardant does not become part of the textile fibers.

The following examples are presented for purposes of illustration, and are not intended to impose limitations on the scope of this invention.

EXAMPLE 1

Several brominated flame retardants were subjected particle size reduction in a jet mill (Micron-Master® 02-506, Jet Pulverizer Co.): a brominated anionic polystyrene (Br-aPS); low molecular weight brominated anionic polystyrenes (low m.w. Br-aPS); and brominated anionic chain transfer polystyrenes (Br-actPS).

The weight average molecular weights ($M_w$) of the polymeric brominated flame retardants were determined by GPC light scattering using a Waters, Inc. model 510 HPLC pump; the columns were μStyragel, 500, 10,000 and 100,000 (Waters Corporation). The autosampler was Model Sil 9A (Shimadzu Corporation). The detectors were a refractive index detector (Model 410, Waters Corporation), and a light scattering detector, (Model PD 2000, Precision Detectors, Inc.). A polystyrene standard ($M_w$=185,000) is routinely used to verify the accuracy of the light scattering data. The test procedure used entailed dissolving 0.015 to 0.020 g of sample in 10 mL of tetrahydrofuran (HPLC grade). An aliquot of this solution was filtered, and 50 μL was injected on the columns. The separation was analyzed using software provided by Precision Detectors, Inc., for the PD 2000 light scattering detector.

Particle size determinations were performed using a laser diffractometer (LS™-13 320, Beckman Coulter, Inc.). Results of the particle size reductions are summarized in Table 1 below.

TABLE 1

| Brominated flame retardant | $M_w$ | Br content | Initial avg. particle size | Jet-milled avg. particle size |
|---|---|---|---|---|
| Br-actPS | 2498[1] | 74 wt % | 25.0 μm | 4.8 μm |
| Br-actPS | 2743 | 77 wt % | 33.2 μm | 3.8 μm |
| low m.w. Br-aPS | 3322 | 75 wt % | 32.0 μm | 2.8 μm |
| low m.w. Br-aPS | 2789 | 73 wt % | 31.9 μm | 2.8 μm |
| Br-aPS | 14,000[2] | 68 wt % | 222.0 μm | 2.7 μm |

[1]Average value.
[2]Typical value; ranges from 13,500 to 14,500.

EXAMPLE 2

Several flame retardant dispersions were prepared, each containing a different brominated flame retardant. To prepare each dispersion, in a flask equipped with an overhead stirrer, water was mixed with the dispersant, followed by the wetting agent. Then the brominated flame retardant was slowly added (in 5 to 10 g portions); the stirrer speed was increased to 1500 rpm. When the mixture looked milky (after 2 or 3 minutes), the thickener was added, increasing the viscosity of the mixture. The reagents and amounts for the coating compositions are summarized in Table 2; reagents are listed in the order added.

In these runs, the dispersant was the sodium salt of polynaphthalenesulfonic acid (DARVAN® 670; Vanderbilt Minerals, LLC); the wetting agent was sodium dioctyl sulfosuccinate (70% in water/propylene glycol, COLA® Wet DOSS PG; Colonial Chemical, Inc.); and the thickener was sodium polyacrylate (15 wt % in water, TEXIGEL® 23-005; Scott Bader Company Ltd.). The brominated flame retardants were bis(pentabromophenyl)ethane (average particle size 5 μm; comparative run; SAYTEX® 8010, Albemarle Corporation); ethylenebis(tetrabromophthalimide) (average particle size 3 μm; comparative run; SAYTEX® BT-93, Albemarle Corporation); a brominated anionic polystyrene having a weight average molecular weight of about 10,000 to about 20,000, and about 67 wt % to about 69 wt % bromine (Br-aPS); brominated anionic chain transfer polystyrenes (Br-actPS) with an average particle size of 4.8 μm; a Br-actPS with an average particle size of 3.8 μm; low molecular weight brominated anionic polystyrenes (low m.w. Br-aPS) with an average particle size of 2.8 μm; and another low m.w. Br-aPS.

A viscosity of 2000 to 6000 cP was desired for the dispersion. A pH of 7.5 to 9.5 was desired for the dispersion. The pH was checked with pH paper, and the viscosity was measured with a digital viscometer (model no. DV-II Pro, Brookfield Engineering Laboratories, Inc.). When the pH was too low, ammonia was added; when the pH was too high, monobasic ammonium phosphate was added. When added, the pH adjustment substance was about 1 g. When the viscosity was too low, more thickener was added; when the viscosity was too high, more water was added.

EXAMPLE 3

Coating compositions were prepared from the flame retardant dispersions of Example 2. To prepare each coating composition, in a flask equipped with an overhead stirrer, an aqueous mixture of the coating resin (aq., 49 wt %) was mixed with the plasticizer and an antifoaming agent. After stirring for about 2 minutes, an additional coating resin (aq., 30 wt %) and water were added, followed by ammonia (25%). After stirring for about 5 minutes, a portion of a flame retardant dispersion formed as in Example 2 was added, along with antimony trioxide. Then the stirrer speed was increased to 1500 to 2000 rpm, and the mixture was stirred for approximately 15 minutes. After the 15-minute stirring period, the viscosity and the pH of the mixture were measured, with a with a digital viscometer (model no. DV-II Pro, Brookfield Engineering Laboratories, Inc.) and pH paper, respectively. The reagents and amounts for the coating compositions are summarized in Table 2; reagents are listed in the order added.

A viscosity of 7000 to 9000 cP was desired for the coating composition. A pH of 9 to 10 was desired for the coating composition. When the pH was too low, ammonia was added; when the pH was too high, monobasic ammonium phosphate was added. When added, the pH adjustment substance was about 1 g. When the viscosity was too low, more additional coating resin was added; when the viscosity was too high, more water was added.

In these runs, the coating resin was a polyvinyl chloride acrylic latex (VYCAR® 460x46; Lubrizol Corporation); the plasticizer was 2-ethylhexyldiphenyl phosphate (SANTICIZER® 141; Valtris Specialty Chemicals); the antifoaming agent was based on petroleum distillates (ANTIMUSSOL® C1; Archroma Packaging & Paper Specialties); the additional coating resin was an acrylic copolymer emulsion (RHEOVIS® AS 1130; BASF); and the antimony trioxide was PERFORMAX® 401 (Lubrizol Corporation).

TABLE 2

| Flame retardant dispersion | | Coating composition | |
|---|---|---|---|
| Water | 145 g | Coating resin | 130 g |
| Brominated flame retardant | 345 g | Plasticizer | 19 g |
| Dispersant | 2.5 g | Additional coating resin* | 15 g |
| Wetting agent | 3.0 g | Antifoaming agent | 0.7 g |
| Thickener | 12.0 g | Water* | 93.4 g |
| | | Ammonia | 4.5 g |
| | | Flame retardant dispersion | 154 g |
| | | Antimony trioxide | 73 g |

*The additional coating resin was 26 g for the bis(pentabromophenyl)ethane runs and for the ethylenebis(tetrabromophthalimide) runs; the coating compositions for these flame retardants also included an additional 250 g of water.

EXAMPLE 4

Coating compositions prepared as in Example 3 were coated onto textile substrates and tested for flame retardancy. The textile substrate for all tests was a woven cotton weighing 110 g/m² (3.24 oz/yd²; Testfabrics, Inc., no. 1403001, style 400). Each coating composition was applied to a fresh portion of cotton by knife coating with a Labcoater (LTE-S (M); Mathis AG). In the Labcoater, the cotton (33×43 cm) was fixed to the pin frame therein, and a knife was placed at one edge of the cotton and the coating composition was placed close to the knife, which moved forward and coated the cotton with the coating composition. When the knife movement was finished, the coated cotton went into an oven (as programmed) to drive off water and other volatiles. Homogeneity of the coating on the cotton was gauged by optical microscopy (Optiphot K13530 optical microscope with Optimas 5 optical software; Nikon, Inc.).

The coated cotton samples were subjected to horizontal flammability testing according to FMVSS-302 (also known as ASTM D5132-04) and to vertical flammability testing according to NFPA-701. To pass the FMVSS-302 test, a material should have a burn rating of less than 4 inches/min (10.1 cm/min). To pass the NFPA-701 test, a coated textile should have a weight loss of less than 40 wt %.

Results of the FMVSS-302 test are summarized in Table 3, and results of the NFPA-701 test are summarized in Table 4. Although the particle size is not listed for some of the brominated flame retardants for Tables 3 and 4, all of the brominated flame retardants used in forming the coatings had an average particle size of 15 μm or less.

TABLE 3

| FMVSS-302 | Run | Viscosity[1] | AOW[2] | Coating load[3] | Burn rating[4] | Result |
|---|---|---|---|---|---|---|
| Cotton (untreated), 3.1 g | compar. | N/A | N/A | N/A | 5.7 | fail |
| $(Br_5Ph)_2$ethane[5] | compar. | 9500 cP | 14 wt % | 12 wt % | 5.2 | fail |
| $(Br_5Ph)_2$ethane | compar. | 9500 cP | 19 wt % | 16 wt % | SE | pass |
| $(Br_5Ph)_2$ethane | compar. | 9500 cP | 39 wt % | 28 wt % | SE | pass |
| $(Br_5Ph)_2$ethane | compar. | 9900 cP | 60 wt % | 38 wt % | SE | pass |
| ethylenebis($Br_4$phthalimide) | compar. | 8000 cP | 10 wt % | 9 wt % | 5.2 | fail |
| ethylenebis($Br_4$phthalimide) | compar. | 8000 cP | 16 wt % | 14 wt % | SE | pass |
| ethylenebis($Br_4$phthalimide) | compar. | 8400 cP | 77 wt % | 44 wt % | SE | pass |
| Br-aPS[6] | invent. | 9500 cP | 80 wt % | 44 wt % | SE | pass |
| Br-actPS,[6] 3.8 μm | invent. | 9000 cP | 55 wt % | 35 wt % | SE | pass |
| Br-actPS, 4.8 μm | invent. | 9000 cP | 85 wt % | 46 wt % | SE | pass |
| Br-actPS, 4.8 μm | invent. | 9000 cP | 245 wt % | 71 wt % | SE | pass |
| low m.w. Br-aPS,[6] 2.8 μm | compar. | 8500 cP | 9 wt % | 8 wt % | 5.5 | fail |
| low m.w. Br-aPS, 2.8 μm | invent. | 8500 cP | 15 wt % | 13 wt % | SE | pass |
| low m.w. Br-aPS, 2.8 μm | invent. | 8500 cP | 19 wt % | 16 wt % | SE | pass |
| low m.w. Br-aPS, 2.8 μm | invent. | 8500 cP | 35 wt % | 26 wt % | SE | pass |
| low m.w. Br-aPS | invent. | 9125 cP | 35.5 wt % | 26 wt % | SE | pass |

[1]Viscosity of the coating composition.
[2]AOW is the add-on weight (or additional weight) to the cotton from the coating composition after removal of water and other volatiles.
[3]The amount of coating composition on the cotton, based on the combined weight of the cotton fabric and the coating composition after removal of water and other volatiles.
[4]Burn rating is reported in inches/min; SE stands for self-extinguishing, which means that the sample extinguished once the flame was removed.
[5]This molecule is also called decabromodiphenyl ethane or ethylene bis(pentabromophenyl).
[6]Br-aPS = brominated anionic polystyrene; Br-actPS = brominated anionic chain transfer polystyrene; low m.w. Br-aPS = low molecular weight brominated anionic polystyrene.

TABLE 4

| NFPA-701 | Run | Viscosity[1] | AOW[2] | Coating load[3] | Wt. loss | Result |
|---|---|---|---|---|---|---|
| Cotton, 4.36 g | compar. | N/A | N/A | N/A | 99% | fail |
| $(Br_5Ph)_2$ethane[4] | compar. | 9500 cP | 14 wt % | 12 wt % | 44% | fail |
| $(Br_5Ph)_2$ethane | compar. | 9500 cP | 19 wt % | 16 wt % | 36% | pass |
| $(Br_5Ph)_2$ethane | compar. | 9500 cP | 39 wt % | 28 wt % | 29% | pass |
| $(Br_5Ph)_2$ethane | compar. | 9900 cP | 42 wt % | 30 wt % | 32% | pass |
| ethylenebis($Br_4$phthalimide) | compar. | 8000 cP | 10 wt % | 9 wt % | 47% | fail |
| ethylenebis($Br_4$phthalimide) | compar. | 8000 cP | 16 wt % | 14 wt % | 36% | pass |
| ethylenebis($Br_4$phthalimide) | compar. | 8400 cP | 85 wt % | 46 wt % | 26% | pass |
| Br-aPS[5] | invent. | 9500 cP | 85 wt % | 46 wt % | 17% | pass |
| Br-actPS,[5] 3.8 μm | invent. | 9000 cP | 63 wt % | 39 wt % | 17% | pass |
| Br-actPS, 4.8 μm | invent. | 9000 cP | 90 wt % | 47 wt % | 25% | pass |
| Br-actPS, 4.8 μm | invent. | 9000 cP | 272 wt % | 73 wt % | 20% | pass |
| low m.w. Br-aPS,[5] 2.8 μm | compar. | 8500 | 9 wt % | 8 wt % | 58% | fail |
| low m.w. Br-aPS, 2.8 μm | invent. | 8500 | 15 wt % | 13 wt % | 37% | pass |
| low m.w. Br-aPS, 2.8 μm | invent. | 8500 | 19 wt % | 16 wt % | 27% | pass |
| low m.w. Br-aPS, 2.8 μm | invent. | 8500 | 40 wt % | 29 wt % | 23% | pass |
| low m.w. Br-aPS | invent. | 9125 | 37.6 wt % | 27 wt % | 26.7% | pass |

[1]Viscosity of the coating composition.
[2]AOW is the add-on weight (or additional weight) to the cotton from the coating composition after removal of water and other volatiles.
[3]The amount of coating composition on the cotton, based on the combined weight of the cotton fabric and the coating composition after removal of water and other volatiles.
[4]This molecule is also called decabromodiphenyl ethane or ethylene bis(pentabromophenyl).
[5]Br-aPS = brominated anionic polystyrene; Br-actPS = brominated anionic chain transfer polystyrene; low m.w. Br-aPS = low molecular weight brominated anionic polystyrene.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

The invention may comprise, consist, or consist essentially of the materials and/or procedures recited herein.

As used herein, the term "about" modifying the quantity of an ingredient in the compositions of the invention or employed in the processes or methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the processes or methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation in its practice. Therefore the foregoing description is not intended to limit, and should not be construed as limiting, the invention to the particular exemplifications presented hereinabove.

The invention claimed is:

1. An aqueous flame retardant dispersion comprising
   water;
   a brominated flame retardant which has an average particle size of about 20 μm or less, wherein the brominated flame retardant contains aromatically-bound bromine and is selected from a) brominated styrenic polymers which have weight average molecular weights of about 650 to about 950,000 and a bromine content of about 60 wt % or more, and/or b) a brominated anionic chain transfer vinyl aromatic polymer which contains about 70 wt % or more bromine;
   at least one dispersant;
   at least one wetting agent; and
   at least one thickener;
   wherein the flame retardant dispersion contains about 25 wt % or more brominated flame retardant, based on the total weight of the dispersion.

2. A flame retardant dispersion as in claim 1 wherein the brominated flame retardant is
   A) a brominated styrenic polymer which is
      i) a brominated styrenic polymer having a weight average molecular weight of about 100,000 to about 950,000, and/or a bromine content of about 60 wt % to about 71 wt %; and/or
      ii) a brominated anionic styrenic polymer having a weight average molecular weight of about 8,000 to about 50,000, and/or a bromine content of about 60 wt % to about 72 wt %; and/or
      iii) a brominated anionic styrenic polymer having a weight average molecular weight of about 650 to about 4000, and/or a bromine content of about 60 wt % to about 77 wt %; and/or
   B) a brominated anionic chain transfer vinyl aromatic polymer having a weight average molecular weight of about 1000 to about 21,000, and/or a bromine content of about 70 wt % to about 79 wt %.

3. A flame retardant dispersion as in claim 1 wherein the brominated flame retardant has an average particle size of about 10 μm or less and/or wherein the brominated flame retardant was subjected to particle size reduction with a jet mill, and/or wherein the flame retardant dispersion contains about 50 wt % or more brominated flame retardant, based on the total weight of the dispersion.

4. A process for forming an aqueous flame retardant dispersion, which process comprises combining
   water;
   a brominated flame retardant which has an average particle size of about 20 μm or less, wherein the brominated flame retardant contains aromatically-bound bromine and is selected from a) brominated styrenic polymers which have weight average molecular weights of about 650 to about 950,000 and a bromine content of about 60 wt % or more, and/or b) a brominated anionic chain transfer vinyl aromatic polymer which contains about 70 wt % or more bromine;
   at least one dispersant;
   at least one wetting agent; and
   at least one thickener;
   wherein the flame retardant dispersion contains about 25 wt % or more brominated flame retardant, based on the total weight of the dispersion.

5. A process as in claim 4 wherein the brominated flame retardant is
   A) a brominated styrenic polymer which is
      i) a brominated styrenic polymer having a weight average molecular weight of about 100,000 to about 950,000, and/or a bromine content of about 60 wt % to about 71 wt %; and/or
      ii) a brominated anionic styrenic polymer having a weight average molecular weight of about 8,000 to about 50,000, and/or a bromine content of about 60 wt % to about 72 wt %; and/or
      iii) a brominated anionic styrenic polymer having a weight average molecular weight of about 650 to about 4000, and/or a bromine content of about 60 wt % to about 77 wt %; and/or
   B) a brominated anionic chain transfer vinyl aromatic polymer having a weight average molecular weight of about 1000 to about 21,000, and/or a bromine content of about 70 wt % to about 79 wt %.

6. A process as in claim 4 wherein the brominated flame retardant has an average particle size of about 10 μm or less and/or wherein the brominated flame retardant was subjected to particle size reduction with a jet mill, and/or wherein the flame retardant dispersion contains about 50 wt % or more brominated flame retardant, based on the total weight of the dispersion.

7. A coating composition comprising
   water;
   a brominated flame retardant which has an average particle size of about 20 μm or less, wherein the brominated flame retardant contains aromatically-bound bromine and is selected from a) brominated styrenic polymers which have weight average molecular weights of about 650 to about 950,000 and a bromine content of about 60 wt % or more, and/or b) a brominated anionic chain transfer vinyl aromatic polymer which contains about 70 wt % or more bromine;
   at least one dispersant;
   at least one wetting agent;
   at least one thickener;
   at least one flame retardant synergist; and
   at least one coating resin;

wherein the coating composition contains about 4 wt % or more brominated flame retardant, based on the total weight of the coating composition.

8. A coating composition as in claim 7 wherein the brominated flame retardant is
   A) a brominated styrenic polymer which is
      i) a brominated styrenic polymer having a weight average molecular weight of about 100,000 to about 950,000, and/or a bromine content of about 60 wt % to about 71 wt %; and/or
      ii) a brominated anionic styrenic polymer having a weight average molecular weight of about 8,000 to about 50,000, and/or a bromine content of about 60 wt % to about 72 wt %; and/or
      iii) a brominated anionic styrenic polymer having a weight average molecular weight of about 650 to about 4000, and/or a bromine content of about 60 wt % to about 77 wt %; and/or
   B) a brominated anionic chain transfer vinyl aromatic polymer having a weight average molecular weight of about 1000 to about 21,000, and/or a bromine content of about 70 wt % to about 79 wt %.

9. A coating composition as in claim 7 wherein
   the brominated flame retardant has an average particle size of about 10 μm or less and/or wherein the brominated flame retardant was subjected to particle size reduction with a jet mill;
   the coating composition contains about 10 wt % or more brominated flame retardant, based on the total weight of the coating composition;
   the flame retardant synergist is selected from antimony trioxide, antimony pentoxide, sodium antimonate, potassium antimonate, iron oxide, zinc borate, zinc oxide, and zinc stannate;
   the coating composition contains about 3 wt % or more flame retardant synergist, based on the total weight of the coating composition; and/or
   the coating resin is polyvinyl chloride, a copolymer of polyvinyl chloride, or an acrylic copolymer.

10. A process for forming a coating composition as in claim 7, which process comprises combining
    water;
    a brominated flame retardant which has an average particle size of about 20 μm or less, wherein the brominated flame retardant contains aromatically-bound bromine and is selected from a) brominated styrenic polymers which have weight average molecular weights of about 650 to about 950,000 and a bromine content of about 60 wt % or more, and/or b) a brominated anionic chain transfer vinyl aromatic polymer which contains about 70 wt % or more bromine;
    at least one dispersant;
    at least one wetting agent;
    at least one thickener;
    at least one flame retardant synergist; and
    at least one coating resin;
    wherein the coating composition contains about 4 wt % or more brominated flame retardant, based on the total weight of the coating composition.

11. A process as in claim 10 wherein the brominated flame retardant is
    A) a brominated styrenic polymer which is
       i) a brominated styrenic polymer having a weight average molecular weight of about 100,000 to about 950,000, and/or a bromine content of about 60 wt % to about 71 wt %; and/or
       ii) a brominated anionic styrenic polymer having a weight average molecular weight of about 8,000 to about 50,000, and/or a bromine content of about 60 wt % to about 72 wt %; and/or
       iii) a brominated anionic styrenic polymer having a weight average molecular weight of about 650 to about 4000, and/or a bromine content of about 60 wt % to about 77 wt %; and/or
    B) a brominated anionic chain transfer vinyl aromatic polymer having a weight average molecular weight of about 1000 to about 21,000, and/or a bromine content of about 70 wt % to about 79 wt %.

12. A process as in claim 10 wherein
    the brominated flame retardant has an average particle size of about 10 μm or less and/or wherein the brominated flame retardant was subjected to particle size reduction with a jet mill;
    the flame retardant synergist is selected from antimony trioxide, antimony pentoxide, sodium antimonate, potassium antimonate, iron oxide, zinc borate, zinc oxide, and zinc stannate;
    the coating composition contains about 3 wt % or more flame retardant synergist, based on the total weight of the coating composition;
    the coating resin is polyvinyl chloride, a copolymer of polyvinyl chloride, or an acrylic copolymer; and/or
    the coating composition contains about 10 wt % or more brominated flame retardant, based on the total weight of the coating composition.

13. A process for coating textile substrates, which process comprises contacting a textile substrate and a coating composition as in claim 7 to form a coated textile substrate, wherein the coating composition comprises
    water;
    a brominated flame retardant which has an average particle size of about 20 μm or less, wherein the brominated flame retardant contains aromatically-bound bromine and is selected from a) brominated styrenic polymers which have weight average molecular weights of about 650 to about 950,000 and a bromine content of about 60 wt % or more, and/or b) a brominated anionic chain transfer vinyl aromatic polymer which contains about 70 wt % or more bromine;
    at least one dispersant;
    at least one wetting agent;
    at least one thickener;
    at least one flame retardant synergist; and
    at least one coating resin;
    wherein the coating composition contains about 4 wt % or more brominated flame retardant, based on the total weight of the coating composition.

14. A process as in claim 13 wherein the coating composition is applied to a textile substrate by knife coating.

15. A process as in claim 13 wherein the brominated flame retardant is
    A) a brominated styrenic polymer which is
       i) a brominated styrenic polymer having a weight average molecular weight of about 100,000 to about 950,000, and/or a bromine content of about 60 wt % to about 71 wt %; and/or
       ii) a brominated anionic styrenic polymer having a weight average molecular weight of about 8,000 to about 50,000, and/or a bromine content of about 60 wt % to about 72 wt %; and/or
       iii) a brominated anionic styrenic polymer having a weight average molecular weight of about 650 to about 4000, and/or a bromine content of about 60 wt % to about 77 wt %; and/or B) a brominated anionic chain transfer vinyl aromatic polymer having a weight average molecular weight of about 1000 to about 21,000, and/or a bromine content of about 70 wt % to about 79 wt %.

16. A process as in claim 13 wherein the brominated flame retardant has an average particle size of about 10 μm or less and/or wherein the brominated flame retardant was subjected to particle size reduction with a jet mill;

the flame retardant synergist is selected from antimony trioxide, antimony pentoxide, sodium antimonate, potassium antimonate, iron oxide, zinc borate, zinc oxide, and zinc stannate;

the coating composition contains about 3 wt % or more flame retardant synergist, based on the total weight of the coating composition;

the coating resin is polyvinyl chloride, a copolymer of polyvinyl chloride, or an acrylic copolymer; and/or the coating composition contains about 10 wt % or more brominated flame retardant, based on the total weight of the coating composition.

17. A flame retardant dispersion as in claim 2 wherein the brominated flame retardant is a brominated styrenic polymer having a weight average molecular weight of about 100,000 to about 950,000, and/or a bromine content of about 60 wt % to about 71 wt %.

18. A flame retardant dispersion as in claim 2 wherein the brominated flame retardant is a brominated anionic styrenic polymer having a weight average molecular weight of about 8,000 to about 50,000, and/or a bromine content of about 60 wt % to about 72 wt %.

19. A flame retardant dispersion as in claim 2 wherein the brominated flame retardant is a brominated anionic styrenic polymer having a weight average molecular weight of about 650 to about 4000, and/or a bromine content of about 60 wt % to about 77 wt %.

20. A flame retardant dispersion as in claim 2 wherein the brominated flame retardant is a brominated anionic chain transfer vinyl aromatic polymer having a weight average molecular weight of about 1000 to about 21,000, and/or a bromine content of about 70 wt % to about 79 wt %.

* * * * *